(12) United States Patent
Kusaka et al.

(10) Patent No.: US 12,481,305 B2
(45) Date of Patent: Nov. 25, 2025

(54) OPTICAL COMPUTING SYSTEM

(71) Applicant: FUJIKURA LTD., Tokyo (JP)

(72) Inventors: Hiroyuki Kusaka, Tokyo (JP);
Masahiro Kashiwagi, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 963 days.

(21) Appl. No.: 17/633,835

(22) PCT Filed: Jun. 4, 2021

(86) PCT No.: PCT/JP2021/021373
§ 371 (c)(1),
(2) Date: Feb. 8, 2022

(87) PCT Pub. No.: WO2022/004277
PCT Pub. Date: Jan. 6, 2022

(65) Prior Publication Data
US 2022/0229461 A1 Jul. 21, 2022

(30) Foreign Application Priority Data

Jul. 3, 2020 (JP) .................................. 2020-115851

(51) Int. Cl.
G06E 3/00 (2006.01)
G02B 5/18 (2006.01)
G06N 3/067 (2006.01)

(52) U.S. Cl.
CPC ............... G06E 3/001 (2013.01); G02B 5/18 (2013.01); G06N 3/067 (2013.01)

(58) Field of Classification Search
None
See application file for complete search history.

(56) References Cited

U.S. PATENT DOCUMENTS 4,892,370 A * 1/1990 Lee ..................... G02B 27/46
359/107
5,784,200 A * 7/1998 Modegi .................. G03H 1/30
359/569

(Continued)

FOREIGN PATENT DOCUMENTS

CN 1601244 A 3/2005
CN 1711596 A 12/2005

(Continued)

OTHER PUBLICATIONS

Written Opinion issued in corresponding International Application No. PCT/JP2021/021373 mailed Jul. 27, 2021 (3 pages).

(Continued)

Primary Examiner — Robert E. Tallman
(74) Attorney, Agent, or Firm — Osha Bergman Watanabe & Burton LLP

(57) ABSTRACT

An optical computing system includes: a light diffraction element group including n pieces of light diffraction elements, where n is a natural number of 2 or more. Each of the n pieces includes cells, each of which has a thickness or a refractive index that is independently set. Each of the cells is classified into a C1 cell or a C2 cell. The thickness or the refractive index of each of the C1 cells is set such that optical computing that is carried out by the light diffraction element group becomes an identity operation when the C2 cells are masked.

5 Claims, 3 Drawing Sheets

(56) References Cited

U.S. PATENT DOCUMENTS

| | | | | |
|---|---|---|---|---|
| 5,784,309 | A | * | 7/1998 | Budil ........................ G06E 1/045 708/835 |
| 6,906,861 | B2 | * | 6/2005 | Tompkin .................... G02B 5/18 359/575 |
| 7,847,225 | B2 | * | 12/2010 | Yokoyama ............. G06N 3/067 382/156 |
| 2015/0253197 | A1 | * | 9/2015 | Okamoto ................ H04J 14/04 398/28 |
| 2021/0357737 | A1 | * | 11/2021 | Hamerly ................. G06N 3/048 |

FOREIGN PATENT DOCUMENTS

| | | | |
|---|---|---|---|
| CN | 101512643 | A | 8/2009 |
| CN | 102959939 | A | 3/2013 |
| JP | H06-018953 | A | 1/1994 |
| JP | H11-096140 | A | 4/1999 |
| JP | 2006184351 | A | 7/2006 |
| JP | 2007-538266 | A | 12/2007 |
| JP | 2010101653 | A | 5/2010 |
| KR | 19980050960 | A | 9/1998 |
| WO | 2005/002872 | A1 | 1/2005 |
| WO | 2010/092739 | A1 | 8/2010 |

OTHER PUBLICATIONS

International Search Report issued in corresponding International Application No. PCT/JP2021/021373 mailed Jul. 27, 2021 (2 pages).

International Preliminary Report on Patentability issued in International Application No. PCT/JP2021/021373; mailed Jan. 12, 2023 (5 pages).

Lin, et al., "All-Optical Machine Learning Using Diffractive Deep Neural Networks", Arxiv.org, Cornell University Library, 201 Olin Library Cornell University, Apr. 14, 2018, pp. 1-20, XP081108166, DOI: 10.1126/SCIENCE.AAT8084 (20 pages).

Yan Shu-hua, "Design diffractive optical elements with asymmetric structures using the two-dimensional Yang-Gu algorithm", Optical Technique, vol. 30, No. 6, Nov. 2004, p. 690-692 (3 pages).

Li Minghua et at., "Study on the Light Diffaction Effect in Ce:Fe:LiNbO3 Crystal", Acta Optica Sinica, vol. 15, No. 6, Jun. 1995, p. 753-757 (5 pages).

Liu Xin et al., "The simulation of X-ray phase-contrast imageing with partially coherence source",Journal of Shenzhen University Science and Engineering, vol. 24, No. 3, Jul. 2007, p. 261-266 (6 pages).

Office Action issued in corresponding Chinese Application No. 2021800049232, mailed May 21, 2025 (10 pages).

* cited by examiner

OPTICAL COMPUTING SYSTEM

TECHNICAL FIELD

The present invention relates to a light diffraction element which carries out optical computing. Moreover, the present invention relates to an optical computing system which includes such a light diffraction element.

BACKGROUND

A light diffraction element is known that includes a plurality of microcells each of which has an individually set refractive index. This light diffraction element is designed such that light beams which have passed through the microcells are caused to interfere with each other to optically carry out predetermined computing. The optical computing using the light diffraction element can be carried out at a higher speed and low power consumption, as compared with electrical computing using a processor. Patent Literature 1 discloses an optical neural network having an input layer, an intermediate layer, and an output layer. The above light diffraction element can be utilized as, for example, an intermediate layer for such an optical neural network.

PATENT LITERATURE

Patent Literature 1: U.S. Pat. No. 7,847,225

In computing, it is sometimes necessary to refer to both information before the computing and information after the computing. As an example of such computing, in a defect extraction operation for extracting a defect of a subject in an image, an image before the operation is synthesized with an image after the operation, and thus an image can be obtained in which a checker can easily visually identify a type and a location of a defect in the subject. However, signal light which is obtained in a conventional optical computing system that uses the light diffraction element includes only signal light indicative of information after the computing, and does not include signal light indicative of information before the computing. Therefore, the conventional light diffraction element is not suitable for computing that needs to refer to both information before the computing and information after the computing.

One or more embodiments of the present invention provide an optical computing system which makes it possible to obtain signal light indicative of information before the computing, in addition to signal light indicative of information after the computing.

SUMMARY

An optical computing system in accordance with one or more embodiments of the present invention includes a light diffraction element group including n (n is a natural number of 2 or more) pieces of light diffraction elements, each of the light diffraction elements included in the light diffraction element group being constituted by a plurality of cells each of which has a thickness or a refractive index that is independently set, the plurality of cells being classified into two types of cells C1 (i.e., "C1 cells") and C2 (i.e., "C2 cells"), and the thickness or the refractive index of each of the cells C1 of each of the light diffraction elements included in the light diffraction element group being set so that optical computing that is carried out by the light diffraction element group becomes an identity operation when the cells C2 of each of the light diffraction elements included in the light diffraction element group are masked.

According to one or more embodiments of the present invention, it is possible to provide an optical computing system which makes it possible to obtain signal light indicative of information before the computing, in addition to signal light indicative of information after the computing.

DETAILED DESCRIPTION

[Configuration of Light Diffraction Element]

Figure 1:
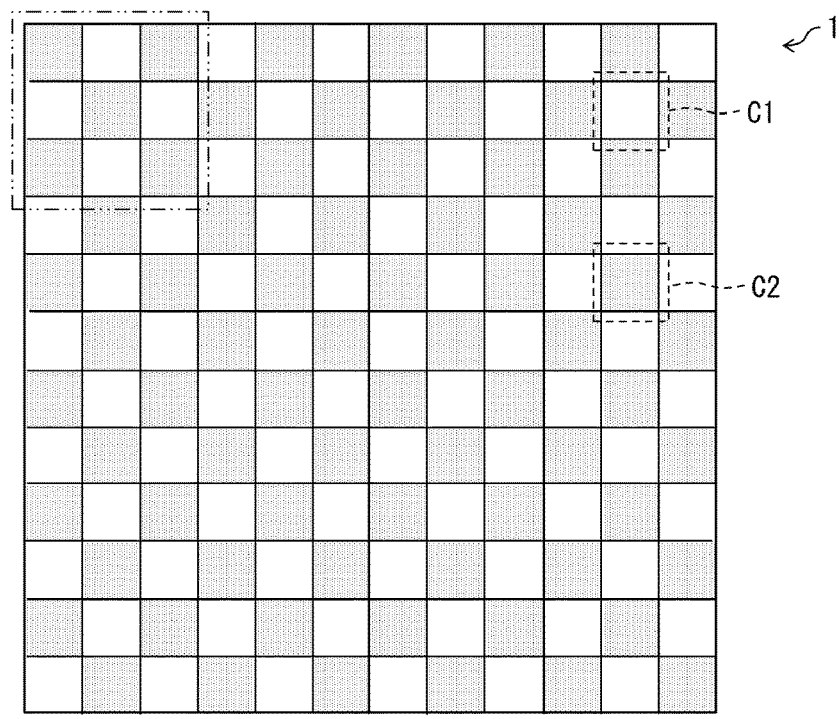
FIG. 1 is a plan view illustrating a configuration of a light diffraction element in accordance with one or more embodiments of the present invention.
Figure 2:
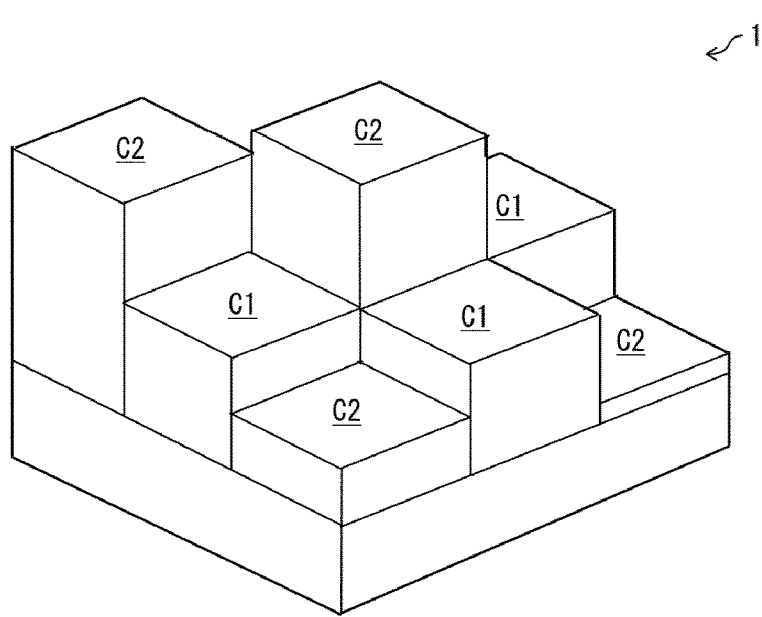
FIG. 2 is a perspective view illustrating a partially magnified portion of the light diffraction element illustrated in FIG. 1.

The following description will discuss a configuration of a light diffraction element 1 in accordance with one or more embodiments of the present invention with reference to FIG. 1 and FIG. 2. FIG. 1 is a plan view illustrating the light diffraction element 1. FIG. 2 is a perspective view in which a part (surrounded by the dashed lines in FIG. 1) of the light diffraction element 1 is magnified.

The light diffraction element 1 is a planar light diffraction element and includes a plurality of microcells (an example of "cell" in claims) whose phase-change amounts are independently set. Here, the term "microcell" refers to a cell having a cell size of less than 10 μm. The term "cell size" refers to a square root of an area of a cell. For example, when a shape of a microcell in a plan view is a square shape, the cell size is a length of one side of the cell. A lower limit of the cell size is not particularly limited and can be, for example, 1 nm.

The light diffraction element 1 illustrated in FIG. 1 is constituted by 12×12 microcells which are arranged in a matrix manner. A shape of each of the microcells in a plan view is a square shape having a size of 1 μm×1 μm, and a shape of the light diffraction element 1 in a plan view is a square shape having a size of 12 μm×12 μm.

The light diffraction element 1 includes two types of microcells C1 and C2 which are subjected to different types of optical computing. The microcells C1 (white cells in FIG. 1) are arranged in a staggered manner, and the microcells C2 (shaded cells in FIG. 1) are also arranged in a staggered manner. That is, each of the microcells C1 abuts on four microcells C2 at its respective four sides, and each of the microcells C2 abuts on four microcells C1 at its respective four sides. The light diffraction element 1 carries out (1) first optical computing that is performed by causing light beams, which have passed through the microcells C1, to interfere with each other and (2) second optical computing that is performed by causing light beams, which have passed through the microcells C2, to interfere with each other. Details of the first optical computing and the second optical computing will be described later with reference to other drawings.

A method for independently setting phase-change amounts of the microcells constituting the light diffraction element 1 for each cell can be (1) a method of independently setting a thickness of a microcell for each microcell, and (2) a method of independently selecting a refractive index of a microcell. In one or more embodiments, the method (1) which can be carried out by nanoimprinting is employed. In this case, each of the microcells C1 and C2 is constituted by a pillar having a square bottom surface and having a quadratic prism shape, as illustrated in FIG. 2.

[Configuration of Optical Computing System]

Figure 3:
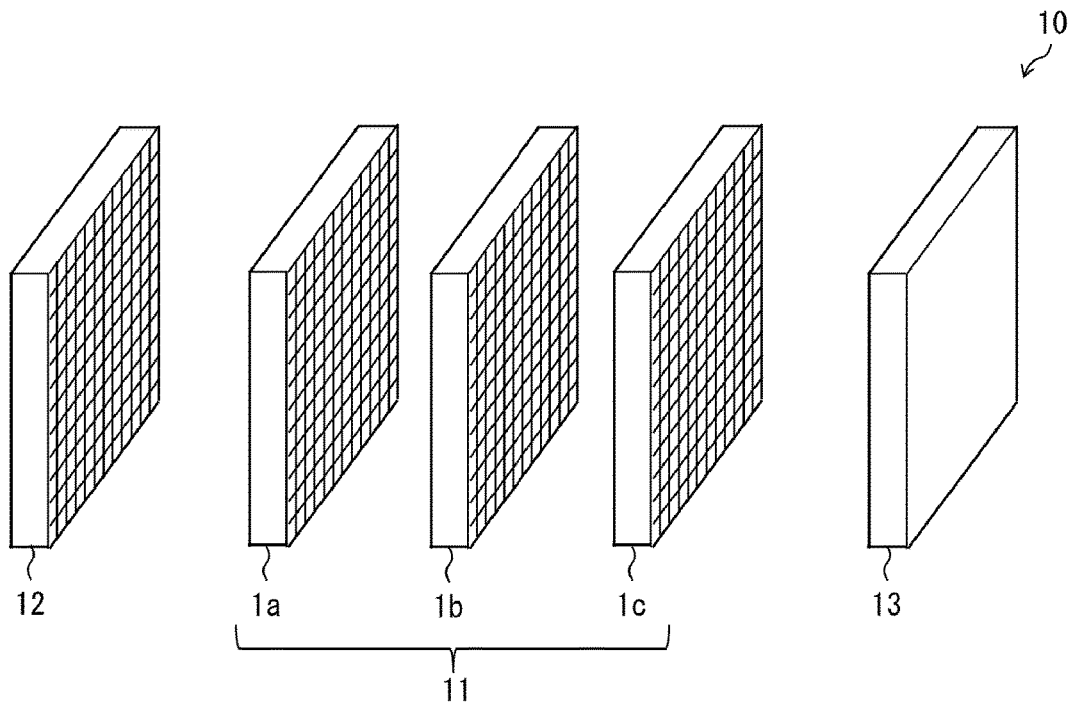
FIG. 3 is a perspective view illustrating a main part configuration of an optical computing system including the light diffraction element illustrated in FIG. 1.

The following description will discuss a configuration of an optical computing system 10 including the light diffraction element 1, with reference to FIG. 3. FIG. 3 is a perspective view illustrating a configuration of the optical computing system 10.

The optical computing system 10 includes a light diffraction element group 11, a light-emitting device 12, and a light-receiving device 13.

The light diffraction element group 11 is constituted by n pieces of light diffraction elements 1 which are arranged parallel to each other. Here, n is a natural number of 2 or more and, in one or more embodiments, n is 3. Hereinafter, when it is necessary to distinguish the light diffraction elements 1 from each other, the first one of the light diffraction elements 1 from the light-emitting device 12 side is referred to as "first light diffraction element 1*a*", the second one of the light diffraction elements 1 from the light-emitting device 12 side is referred to as "second light diffraction element 1*b*", and the third one of the light diffraction elements 1 from the light-emitting device 12 side is referred to as "third light diffraction element 1*c*".

The light-emitting device 12 is a device for emitting signal light that is to be input to the light diffraction element group 11. The light-emitting device 12 has a plurality of cells which are arranged in a matrix manner and is constituted by, for example, a two-dimensional display. The cells in the light-emitting device 12 correspond to, for example, respective microcells of the light diffraction element 1 (i.e., one-to-one correspondence). Signal light, which has been output from each cell of the light-emitting device 12, is input to a corresponding microcell of the first light diffraction element 1*a*.

The signal light which has passed through each of the microcells C1 of the first light diffraction element 1*a* mainly interferes with signal light which has passed through another microcell C1 of the first light diffraction element 1*a*, and is mainly input to each of the microcells C1 of the second light diffraction element 1*b*. Meanwhile, the signal light which has passed through each of the microcells C2 of the first light diffraction element 1*a* mainly interferes with signal light which has passed through another microcell C2 of the first light diffraction element 1*a*, and is mainly input to each of the microcells C2 of the second light diffraction element 1*b*.

Moreover, the signal light which has passed through each of the microcells C1 of the second light diffraction element 1*b* mainly interferes with signal light which has passed through another microcell C1 of the second light diffraction element 1*b*, and is mainly input to each of the microcells C1 of the third light diffraction element 1*c*. Meanwhile, the signal light which has passed through each of the microcells C2 of the second light diffraction element 1*b* mainly interferes with signal light which has passed through another microcell C2 of the second light diffraction element 1*b*, and is mainly input to each of the microcells C2 of the third light diffraction element 1*c*.

The light-receiving device 13 is a device for detecting signal light that has been output from the light diffraction element group 11. The light-receiving device 13 has a plurality of cells which are arranged in a matrix manner and is constituted by, for example, a two-dimensional image sensor. The cells in the light-receiving device 13 correspond to respective microcells of the light diffraction element 1 (i.e., one-to-one correspondence). The signal light which has passed through each of the microcells C1 of the third light diffraction element 1*c* mainly interferes with signal light which has passed through another microcell C1 of the third light diffraction element 1*c*, and is mainly input to each cell of the light-receiving device 13 corresponding to that microcell C1. Meanwhile, the signal light which has passed through each of the microcells C2 of the third light diffraction element 1*c* mainly interferes with signal light which has passed through another microcell C2 of the third light diffraction element 1*c*, and is mainly input to each cell of the light-receiving device 13 corresponding to that microcell C2.

A thickness or a refractive index of each of the microcells C1 of the light diffraction elements 1*a* through 1*c* is set so that optical computing that is carried out by the light diffraction element group 11 becomes an identity operation when the microcells C2 of the light diffraction elements 1*a* through 1*c* are masked. In other words, the thickness or refractive index of each of the microcells C1 of the light diffraction elements 1*a* through 1*c* is set so that a phase distribution or intensity distribution of signal light output from the microcells C1 of the third light diffraction element 1*c* conforms to a phase distribution or intensity distribution of signal light input to the microcells C1 of the first light diffraction element 1*a*, when the microcells C2 of the light diffraction elements 1*a* through 1*c* are masked. Meanwhile, a thickness or a refractive index of each of the microcells C2 of the light diffraction elements 1*a* through 1*c* is set so that optical computing that is carried out by the light diffraction element group 11 becomes an operation other than an identity operation when the microcells C1 of the light diffraction elements 1*a* through 1*c* are masked. In other words, the thickness or refractive index of each of the microcells C2 of the light diffraction elements 1*a* through 1*c* is set so that a phase distribution or intensity distribution of signal light output from the microcells C2 of the third light diffraction element 1*c* does not conform to a phase distribution or intensity distribution of signal light input to the microcells C2 of the first light diffraction element 1 a, when the microcells C1 of the light diffraction elements 1*a* through 1*c* are masked.

Therefore, among the cells constituting the light-receiving device 13, signal light detected by cells corresponding to the microcells C1 of the light diffraction elements 1*a* through 1*c* indicates information before the computing. Here, the term "information before the computing" refers to information indicated by signal light that is output from, among the cells constituting the light-emitting device 12, cells corresponding to the microcells C1 of the light diffraction elements 1*a* through 1*c*. Meanwhile, among the cells constituting the light-receiving device 13, signal light detected by cells corresponding to the microcells C2 of the light diffraction elements 1*a* through 1*c* indicates information after the computing. Here, the term "information after the computing" refers to information obtained by applying predetermined computing to information indicated by signal light that is output from, among the cells constituting the light-emitting device 12, cells corresponding to the microcells C1 of the light diffraction elements 1a through 1c.

As described above, according to the optical computing system 10, it is possible to achieve, with use of the light diffraction element group 11, optical computing for deriving information after the computing while preserving information before the computing. For example, the optical computing system 10 can be suitably used for a defect extraction operation for extracting a defect of a subject from an image. In this case, when an original image is displayed on the light-emitting device 12 which is a display device, the light-receiving device 13 can detect the original image and a defect image which includes only a defect extracted from the original image as a subject.

Figure 4:
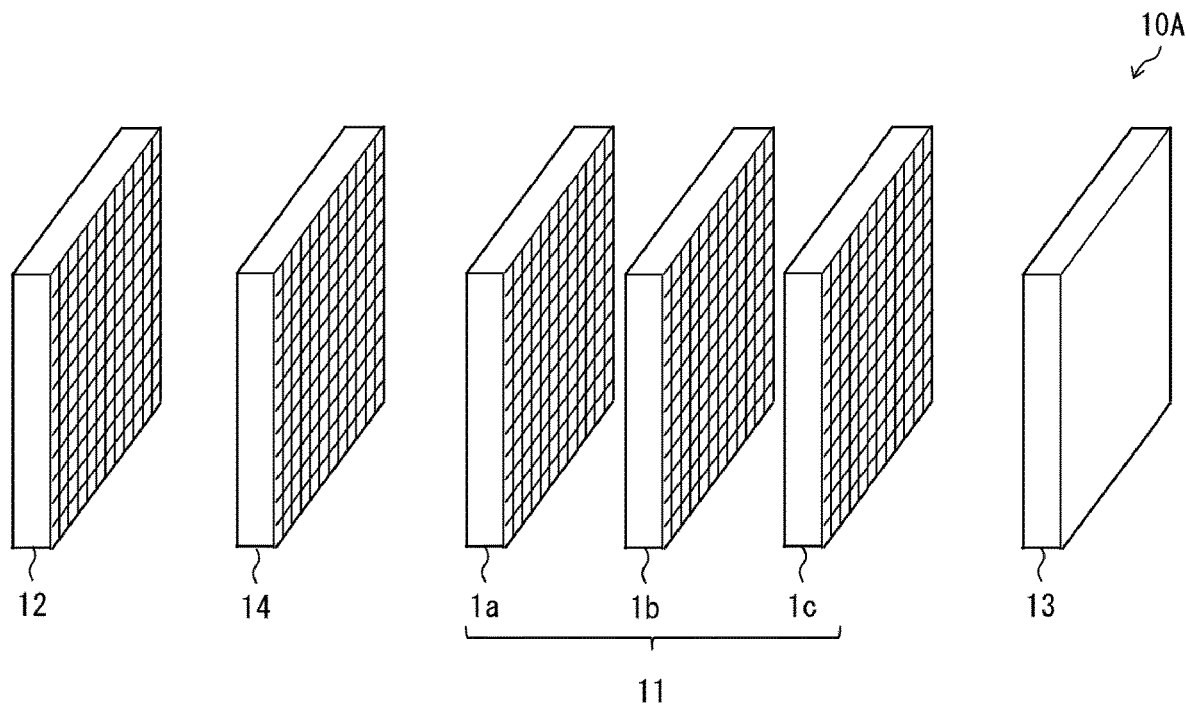
FIG. 4 is a perspective view illustrating a first modification example of the optical computing system illustrated in FIG. 3.
Figure 5:
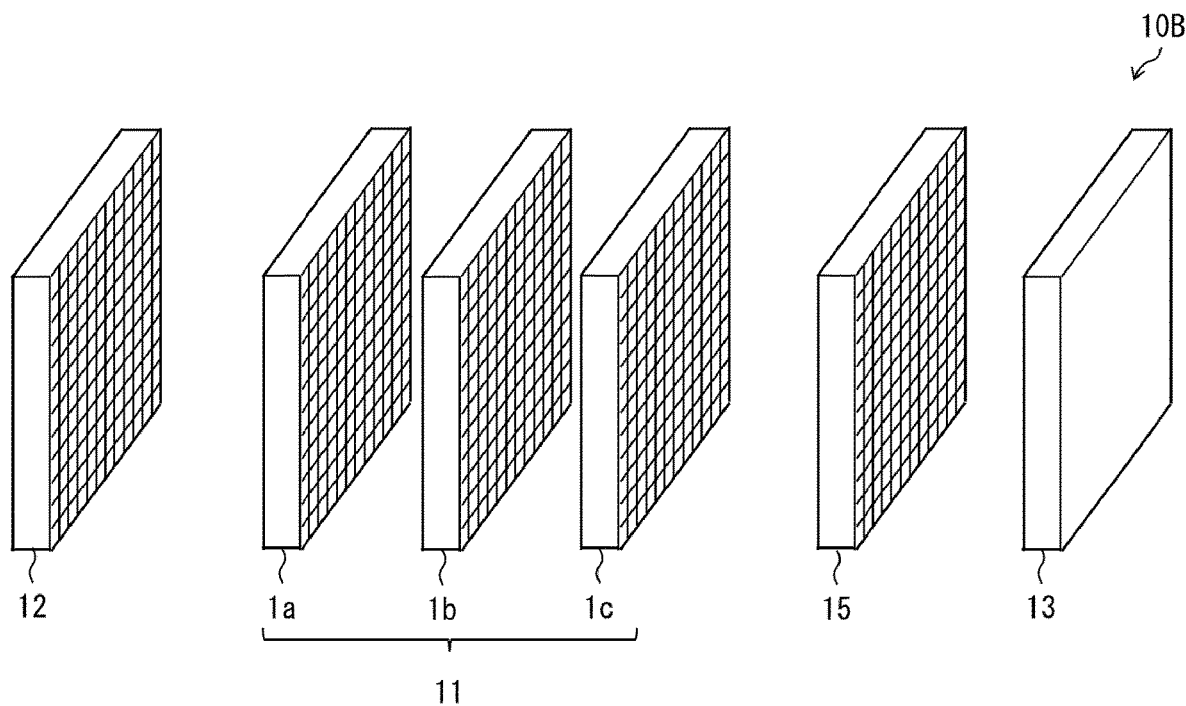
FIG. 5 is a perspective view illustrating a second modification example of the optical computing system illustrated in FIG. 3.
Figure 6:
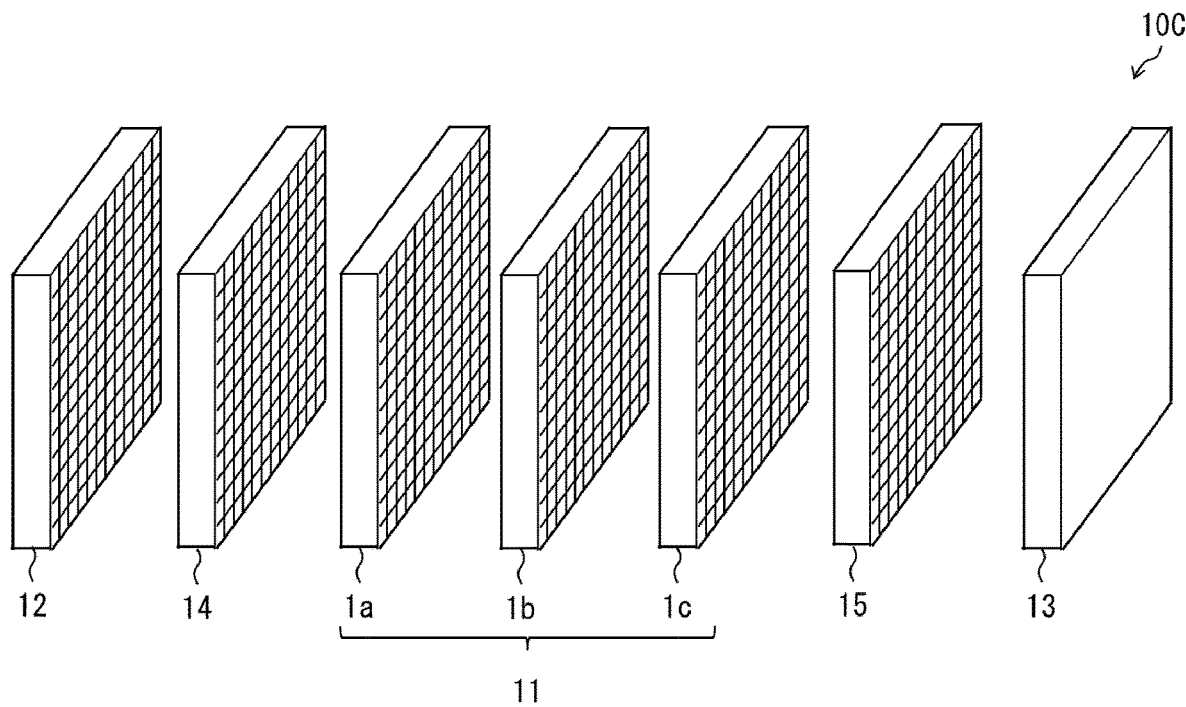
FIG. 6 is a perspective view illustrating a third modification example of the optical computing system illustrated in FIG. 3.

In one or more embodiments, the configuration is employed in which signal light output from the light-emitting device 12 is directly input to the light diffraction element group 11, and signal light output from the light diffraction element group 11 is directly input to the light-receiving device 13. Note, however, that the present invention is not limited to this configuration. For example, it is possible to employ a configuration in which one or more other light diffraction elements are provided on an optical path of signal light output from the light-emitting device 12, and light which has passed through the one or more other light diffraction elements is input to the light diffraction element group 11. Alternatively, it is possible to employ a configuration in which one or more other light diffraction elements are provided on an optical path of signal light output from the light diffraction element group 11, and light which has passed through the one or more other light diffraction elements is input to the light-receiving device 13. Such modification examples are illustrated in FIGS. 4 through 6. An optical computing system 10A illustrated in FIG. 4 employs a configuration in which one light diffraction element 14 is provided at a preceding stage of the light diffraction element group 11, and signal light output from the light diffraction element 14 is input to the light diffraction element group 11. An optical computing system 10B illustrated in FIG. 5 employs a configuration in which one light diffraction element 15 is provided at a following stage of the light diffraction element group 11, and signal light output from the light diffraction element group 11 is input to the light diffraction element 15. An optical computing system 10C illustrated in FIG. 6 employs a configuration in which one light diffraction element 14 is provided at a preceding stage of the light diffraction element group 11, and one light diffraction element 15 is provided at a following stage of the light diffraction element group 11.

An optical computing system in accordance with one or more embodiments of the present invention includes a light diffraction element group including n (n is a natural number of 2 or more) pieces of light diffraction elements, each of the light diffraction elements included in the light diffraction element group being constituted by a plurality of cells each of which has a thickness or a refractive index that is independently set, the plurality of cells being classified into two types of cells C1 and C2, and the thickness or the refractive index of each of the cells C1 of each of the light diffraction elements included in the light diffraction element group being set so that optical computing that is carried out by the light diffraction element group becomes an identity operation when the cells C2 of each of the light diffraction elements included in the light diffraction element group are masked.

According to the configuration, it is possible to output signal light indicative of information after the computing from cells C2 of an n-th light diffraction element, and to output signal light indicative of information before the computing from cells C1 of the n-th light diffraction element.

The optical computing system in accordance with one or more embodiments of the present invention employs, in addition to the configuration of the embodiments described above, a configuration in which, in each of the light diffraction elements included in the light diffraction element group, the cells C1 are arranged in a staggered manner, and the cells C2 are arranged in a staggered manner.

According to the configuration, it is possible to output signal light indicative of information after the computing from cells C2 of an n-th light diffraction element, and to output signal light indicative of information before the computing from cells C1 of the n-th light diffraction element.

The optical computing system in accordance with one or more embodiments of the present invention employs, in addition to the configuration of the embodiments described above, a configuration of further including: one or more other light diffraction elements arranged at a preceding stage of a first light diffraction element included in the light diffraction element group; and/or one or more other light diffraction elements arranged at a following stage of an n-th light diffraction element included in the light diffraction element group.

According to the configuration, it is possible to input, to the light diffraction element group, signal light which has been output from one or more other light diffraction elements arranged at a preceding stage of the first light diffraction element, and/or to input signal light which has been output from the light diffraction element group to one or more other light diffraction elements which are arranged at a following stage of the n-th light diffraction element.

The optical computing system in accordance with one or more embodiments of the present invention employs, in addition to the configuration of any of the embodiments described above, a configuration of further including: a light-emitting device that emits signal light which is input to a first light diffraction element included in the light diffraction element group or emits signal light which is input to one or more other light diffraction elements arranged at a preceding stage of the first light diffraction element; and a light-receiving device that detects signal light which is output from an n-th light diffraction element included in the light diffraction element group or detects signal light which is output from one or more other light diffraction elements arranged at a following stage of the n-th light diffraction element.

According to the configuration, among the cells constituting the light-receiving device, signal light indicative of information before the computing can be detected by cells corresponding to the cells C1 of the light diffraction element. Alternatively, among the cells constituting the other light diffraction element, signal light indicative of information before the computing can be input to cells corresponding to the cells C1 of the light diffraction element. Here, the term "information before the computing" refers to information indicated by signal light that is output from, among the cells constituting the light-emitting device, cells corresponding to the cells C1 of the light diffraction element. Moreover, according to the configuration, among the cells constituting the light-receiving device, signal light indicative of information after the computing can be detected by cells corresponding to the cells C2 of the light diffraction element. Alternatively, among the cells constituting the other light diffraction element, signal light indicative of information after the computing can be input to cells corresponding to the cells C2 of the light diffraction element. Here, the term "information after the computing" refers to information obtained by applying predetermined computing to information indicated by signal light that is output from, among the cells constituting the light-emitting device, cells corresponding to the cells C2 of the light diffraction element.

The optical computing system in accordance with one or more embodiments of the present invention employs, in addition to the configuration of any of the embodiments described above, a configuration in which: the thickness or the refractive index of each of the cells C2 of each of the light diffraction elements included in the light diffraction element group is set so that optical computing that is carried out by the light diffraction element group becomes an operation other than an identity operation when the cells C1 of each of the light diffraction elements included in the light diffraction element group are masked.

According to the configuration, it is possible to output signal light indicative of information after the computing from cells C2 of an n-th light diffraction element, and to output signal light indicative of information before the computing from cells C1 of the n-th light diffraction element.

[Additional Remarks]

The present invention is not limited to the embodiments described above, but may be altered in various ways by a skilled person within the scope of the claims. Any embodiments based on proper combinations of technical means disclosed in the embodiments is also encompassed in the technical scope of the present invention.

Note that the "light diffraction element" in this specification is an element for converting an optical signal indicative of certain information (for example, a certain image) into an optical signal indicative of other information (for example, another image). Therefore, the "light diffraction element" in this specification can alternatively be referred to as "optical filter", as in a case in which an element for converting an electrical signal indicative of a certain image into an electrical signal indicative of another image is called "filter". In this case, the optical computing system disclosed in this specification can also be expressed as follows.

An optical computing system in accordance with one or more embodiments includes an optical filter group including n (n is a natural number of 2 or more) pieces of optical filters, each of the optical filters included in the optical filter group including a plurality of cells for each of which a refractive index is independently set, the plurality of cells being classified into two types of cells C1 and C2, and the refractive index of each of the cells C1 of each of the optical filters included in the optical filter group being set so that a phase distribution of signal light output from the cells C1 of an n-th optical filter conforms to a phase distribution of signal light input to the cells C1 of a first optical filter.

The optical computing system in accordance with one or more embodiments employs, in addition to the configuration of the embodiments described above, a configuration in which, in each of the optical filters included in the optical filter group, the cells C1 are arranged in a staggered manner, and the cells C2 are arranged in a staggered manner.

The optical computing system in accordance with one or more embodiments employs, in addition to the configuration of the embodiments described above, a configuration of further including: one or more other optical filters arranged at a preceding stage of the first optical filter; and/or one or more other optical filters arranged at a following stage of the n-th optical filter.

The optical computing system in accordance with one or more embodiments employs, in addition to the configuration of any of the embodiments described above, a configuration of further including: a light-emitting device that emits signal light which is input to the first optical filter or emits signal light which is input to one or more other optical filters arranged at a preceding stage of the first optical filter; and a light-receiving device that detects signal light which is output from the n-th optical filter or detects signal light which is output from one or more other optical filters arranged at a following stage of the n-th optical filter.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 1a through 1c: Light diffraction element
10: Optical computing system
11: Light diffraction element group
12: Light-emitting device
13: Light-receiving device

The invention claimed is:

1. An optical computing system comprising:
a light diffraction element group comprising n pieces of light diffraction elements that carry out optical computing, where n is a natural number of 2 or more, wherein
each of the n pieces comprises cells, each of which has a thickness or a refractive index that is independently set,
each of the cells is classified into a C1 cell or a C2 cell, and
the thickness or the refractive index of each of the C1 cells is set such that optical computing that is carried out by the light diffraction element group becomes an identity operation when the C2 cells are masked.

2. The optical computing system according to claim 1, wherein in each of the light diffraction elements, the C1 cells are arranged in a staggered manner and the C2 cells are arranged in a staggered manner.

3. The optical computing system according to claim 1, further comprising one or both of:
one or more other light diffraction elements disposed at a preceding stage of a first light diffraction element in the light diffraction element group; and
one or more other light diffraction elements disposed at a following stage of an n-th light diffraction element in the light diffraction element group.

4. The optical computing system according to claim 1, further comprising:
a light-emitting device that emits signal light that is input to either:
a first light diffraction element in the light diffraction element group; or
one or more other light diffraction elements disposed at a preceding stage of the first light diffraction element; and
a light-receiving device that detects signal light that is output from either:

an n-th light diffraction element in the light diffraction element group; or one or more other light diffraction elements disposed at a following stage of the n-th light diffraction element.

5. The optical computing system according to claim 1, wherein the thickness or the refractive index of each of the C2 cells is set such that optical computing that is carried out by the light diffraction element group becomes an operation other than an identity operation when the C1 cells are masked.

* * * * *